United States Patent
Bernhardt et al.

(10) Patent No.: US 8,629,583 B2
(45) Date of Patent: Jan. 14, 2014

(54) ELECTRICAL DEVICE

(75) Inventors: Thomas Bernhardt, Aichtal-Groetzingen (DE); Holger Ruebsaamen, Stuttgart (DE); Andreas Schlegel, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 229 days.

(21) Appl. No.: 12/601,943

(22) PCT Filed: Apr. 3, 2008

(86) PCT No.: PCT/EP2008/053987
§ 371 (c)(1),
(2), (4) Date: Mar. 24, 2010

(87) PCT Pub. No.: WO2008/145438
PCT Pub. Date: Dec. 4, 2008

(65) Prior Publication Data
US 2011/0025142 A1    Feb. 3, 2011

(30) Foreign Application Priority Data

May 25, 2007    (DE) .......................... 10 2007 024 388

(51) Int. Cl.
*H02K 5/00* (2006.01)
*H02K 7/14* (2006.01)
*B25F 5/02* (2006.01)

(52) U.S. Cl.
USPC ................................. 310/50; 310/89; 310/91

(58) Field of Classification Search
USPC ............................... 310/50, 89, 91
See application file for complete search history.

(56) References Cited

U.S. PATENT DOCUMENTS

| 1,551,752 | A | * | 9/1925 | Kriesel | 74/318 |
| 2,401,662 | A | * | 6/1946 | Prat Divi | 310/216.131 |
| 2,685,042 | A | * | 7/1954 | Klett | 310/50 |
| 3,536,280 | A | * | 10/1970 | Barlow | 248/676 |
| 3,875,436 | A | * | 4/1975 | MacFarland | 310/43 |
| 4,162,419 | A | * | 7/1979 | DeAngelis | 310/266 |
| 4,210,835 | A | * | 7/1980 | Neveux | 310/62 |
| 4,420,702 | A | | 12/1983 | Mixner | |
| 4,726,112 | A | * | 2/1988 | King et al. | 29/596 |
| 5,786,647 | A | * | 7/1998 | Vollmer et al. | 310/89 |
| 6,069,423 | A | * | 5/2000 | Miller et al. | 310/51 |
| 6,717,321 | B2 | * | 4/2004 | Mademba-Sy et al. | 310/239 |
| 2004/0032177 | A1 | | 2/2004 | Nitzsche et al. | |
| 2007/0182269 | A1 | * | 8/2007 | Takahashi et al. | 310/217 |

FOREIGN PATENT DOCUMENTS

| CN | 2381422 Y | 6/2000 |
| DE | 10142174 A1 | 3/2003 |

(Continued)

OTHER PUBLICATIONS

Translation of foreign document JP 2004122280 A.*

*Primary Examiner* — Tran Nguyen
*Assistant Examiner* — Alex W Mok
(74) *Attorney, Agent, or Firm* — Maginot, Moore & Beck (57) ABSTRACT

The invention relates to an electrical device, especially an electric tool, which has a motor unit provided with a motor housing, and a receiving unit for receiving at least one drive element. According to the invention, the electrical device includes a motor sleeve for coupling the motor unit to the receiving unit.

15 Claims, 5 Drawing Sheets

(56) References Cited

FOREIGN PATENT DOCUMENTS

| | | |
|---|---|---|
| DE | 202006012489 U1 | 12/2007 |
| EP | 0192469 A2 | 8/1986 |
| FR | 2160215 A | 6/1973 |
| FR | 2470468 A | 5/1981 |
| JP | 59117438 A * | 7/1984 |
| JP | 63039439 A * | 2/1988 |
| JP | 2004122280 A * | 4/2004 |
| JP | 2004136442 A * | 5/2004 |
| JP | 2004249385 A * | 9/2004 |
| RU | 2005 140 110 A | 4/2006 |
| RU | 2313882 C2 | 12/2007 |

* cited by examiner

Fig. 8

ELECTRICAL DEVICE

CROSS-REFERENCE TO RELATED APPLICATION

This application is a 35 USC 371 application of PCT/EP2008/053987 filed on Apr. 3, 2008.

BACKGROUND OF THE INVENTION

1. Field of the Invention

The invention is based on an electrical device, in particular a power tool.

2. Description of the Prior Art

An electrical device with a motor unit that includes a motor housing is already known. The electrical device also includes a receiving unit that is provided for receiving a drive element, with the motor unit situated directly against the receiving unit.

SUMMARY AND ADVANTAGES OF THE INVENTION

The invention is based on an electrical device, in particular a power tool, having a motor unit that includes a motor housing and a receiving unit that is provided for receiving at least one drive element.

According to one proposal, the electrical device has a motor sleeve via which the motor unit is coupled to the receiving unit. In this context, the expression "receiving unit" should in particular be understood to mean a unit that is provided for receiving and/or supporting drive elements, e.g. receiving a motor unit, a drive shaft, a hammer tube, and/or other elements deemed useful by those skilled in the art that convert a rotating motion or driving torque of a motor and/or that is preferably comprised of a receiving flange, in particular an intermediate flange, and/or a subregion or subsection of a housing of the electrical device. The expression "provided" should in particular be understood to mean especially equipped and/or embodied. Preferably, in addition to the motor housing, the motor unit includes at least one motor, in particular an electrically driven motor, and/or a motor shaft, with the motor and/or motor shaft being at least partially encompassed by the motor housing. The expression "motor sleeve" in this case should in particular be understood to mean a sleeve that is provided for fastening and/or coupling the motor unit to the receiving unit and that encompasses the motor in addition to a motor housing. The embodiment according to the invention makes it possible, in a structurally simple fashion, to achieve a modular arrangement, in particular of the motor unit, inside the receiving unit, which also permits a particularly advantageous protection of the motor unit from undesirable dust and/or undesirable moisture. In addition, a particularly simple installation of the motor unit can be implemented by first placing the motor unit in the motor sleeve and then fastening it, together with the sleeve, to the receiving unit. It is thus advantageously possible to avoid supporting the motor unit directly on a housing of the electrical device. The electrical device is advantageously comprised of a power tool, in particular a hand-guided power tool.

According to another proposal, the motor sleeve has at least one fastening unit that is provided for fastening the motor unit and/or the receiving unit, thus making it possible to achieve a particularly advantageous, space-saving fastening of the motor sleeve to the motor unit and/or the receiving unit. In this context, the expression "fastening unit" should in particular be understood to be a unit that, by means of a particular shape and/or an arrangement of particular fastening elements, is provided for fastening the motor unit and/or the receiving unit.

If the fastening unit has at least one fastening element for axially securing the motor unit, this makes it possible to achieve a support of the motor unit without play in the axial direction and in particular, a play-free transmission of a driving torque from the motor unit to a shaft such as an intermediate shaft and/or other transmission elements and/or drive elements deemed suitable by those skilled in the art. This can be achieved in a particularly advantageous fashion if the fastening element is provided for a toolless fastening of the motor unit to the motor sleeve and/or a detachable connection between the motor unit and the motor sleeve, which permits a rapid and structurally simple replacement of the motor unit in the event of a defect, as can be achieved in particular by a fastening element embodied in the form of a decent element and/or a bayonet coupling element and/or other fastening elements deemed suitable by those skilled in the art. In this context, the expression "axial direction" should in particular be understood to mean a direction that extends essentially along a rotation axis of a shaft of the motor unit. In this connection, a "bayonet coupling element" should in particular be understood to mean a fastening element that, together with another fastening element, through a combination of a linear insertion movement and a subsequent rotating motion in relation to the other fastening element, produces a securing and fastening in relation to this fastening element.

According to another proposal, the motor housing has at least one detent element and/or bayonet coupling element that corresponds to the fastening element of the motor sleeve, making it possible to achieve a structurally simple fastening of the motor unit to the motor sleeve.

If the fastening unit includes at least one fastening element for securing the motor unit in a circumference direction, it is thus possible to inexpensively and simply achieve a space-saving securing in the circumference direction. The "circumference direction" should be understood here to mean the direction of the motor unit that in particular extends around a rotation axis of a shaft of the motor unit and is oriented perpendicular to the rotation axis.

A particularly structurally simple fastening element for securing the motor unit in the circumference direction can be achieved if the fastening element is comprised of an axially extending rib.

According to another proposal, the fastening unit has at least one fastening element for fastening to the receiving unit, making it possible to advantageously fasten the motor unit to the receiving unit via the motor sleeve. In this case, it is particularly advantageous for the fastening element to be comprised of a detent element so that in particular, it is possible to achieve a toolless fastening. The fastening unit for fastening the motor sleeve to the receiving unit and the fastening unit for fastening the motor sleeve to the motor unit can also be embodied as integral to the motor sleeve.

If the receiving unit has at least one conically embodied form-locking element for centering the motor sleeve, this makes it possible to receive and center the motor unit inside the receiving unit in a structurally simple way. Preferably, the conically embodied form-locking element comprises a tapering receiving region of the receiving unit, extending in a receiving direction. If the motor sleeve also includes a conically embodied form-locking element, it is possible to achieve a precisely fitting insertion and a play-free support of the motor unit in a simple way.

According to another proposal, the motor sleeve has at least one cooling conduit for cooling the motor unit, making it possible to achieve a particularly space-saving arrangement of the cooling conduit. Preferably, the cooling conduit is provided to permit a coolant, in particular air, to flow through. The cooling conduit in this case can advantageously extend along a direction of a transmission of heat between the motor unit and the motor sleeve and/or on a side of the motor sleeve oriented away from the motor unit, for example in the case of a thermally conductive motor sleeve.

According to another proposal, the motor sleeve has a wall with at least one air inlet opening, making it possible for air to advantageously flow through an intermediate space between the motor sleeve and the motor unit in order to cool the motor unit.

If the motor sleeve has a receiving region for receiving a set of motor electronics, it is thus possible to advantageously reduce the number of additional parts, save space, and reduce assembly complexity and costs for supporting the motor unit. The receiving region for receiving the motor electronics is advantageously situated on a side of the motor sleeve oriented away from the motor unit so that individual components of the motor electronics can be replaced in the event of a defect, with a particularly low installation complexity. Furthermore a cooling unit for cooling the motor unit can advantageously be used to cool the motor electronics, e.g. a cooling conduit extending underneath the motor electronics and the motor sleeve. In this context, the expression "motor electronics" should in particular be understood to mean a set of electronics provided to control and/or regulate and/or adjust the motor during an operation of the electrical device.

According to another proposal, the motor sleeve has at least one receiving region in which a fan of the motor unit is at least partially situated, making it possible, in a structurally simple fashion, to advantageously reduce the number of additional parts, save space, and reduce assembly complexity and costs for supporting the fan. The receiving region for receiving the fan can advantageously be integral with a receiving region of the motor sleeve for receiving the motor or motor unit.

BRIEF DESCRIPTION OF THE DRAWINGS

Other advantages ensue from the following description of the drawings. The drawings show exemplary embodiments of the invention. The drawings, the description, and the claims contain numerous features in combination. Those skilled in the art will also suitably consider the features individually and unite them in other meaningful combinations.

DESCRIPTION OF THE PREFERRED EMBODIMENTS

Figure 1:
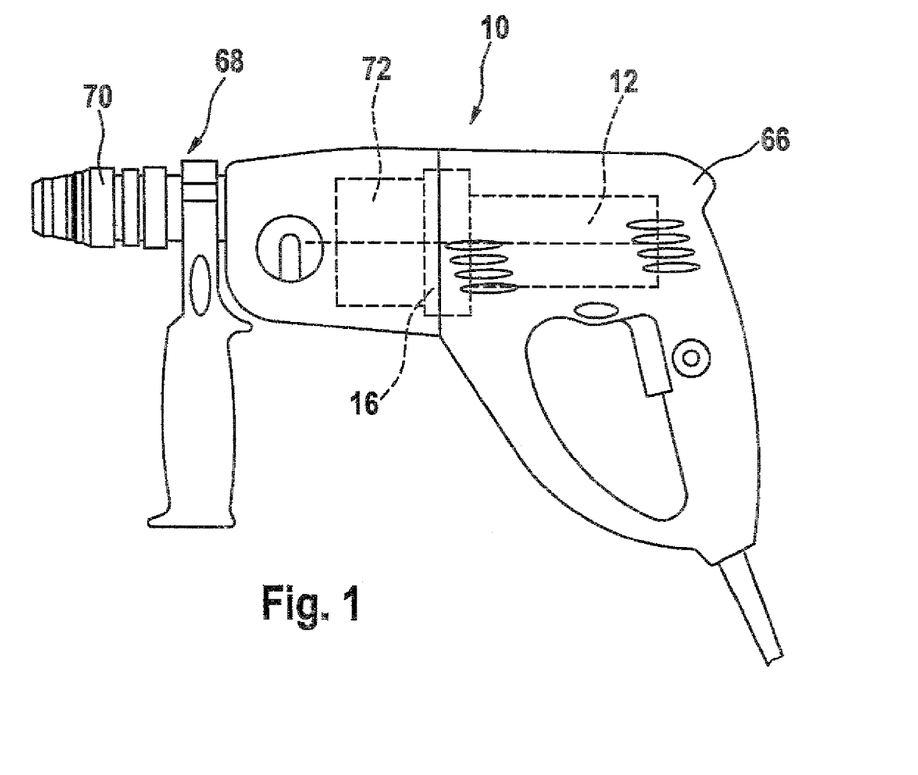
FIG. 1 is a side view of an electrical device embodied in the form of a rotary hammer.

FIG. 1 shows an electrical device 10 that is embodied in the form of a hand-guided power tool. The hand-guided power tool embodied in the form of a rotary hammer includes a housing 66 and a tool holder 70 in a front region 68 for holding a tool that is not shown in detail. The hand-guided power tool has a motor unit 12 for producing a driving torque. The hand-guided power tool also includes a receiving unit 16 for supporting and fastening the motor unit 12 inside the hand-guided power tool. The driving torque of the motor unit 12 is transmitted to the tool via a transmission apparatus 72 of the hand-guided power tool.

Figure 2:
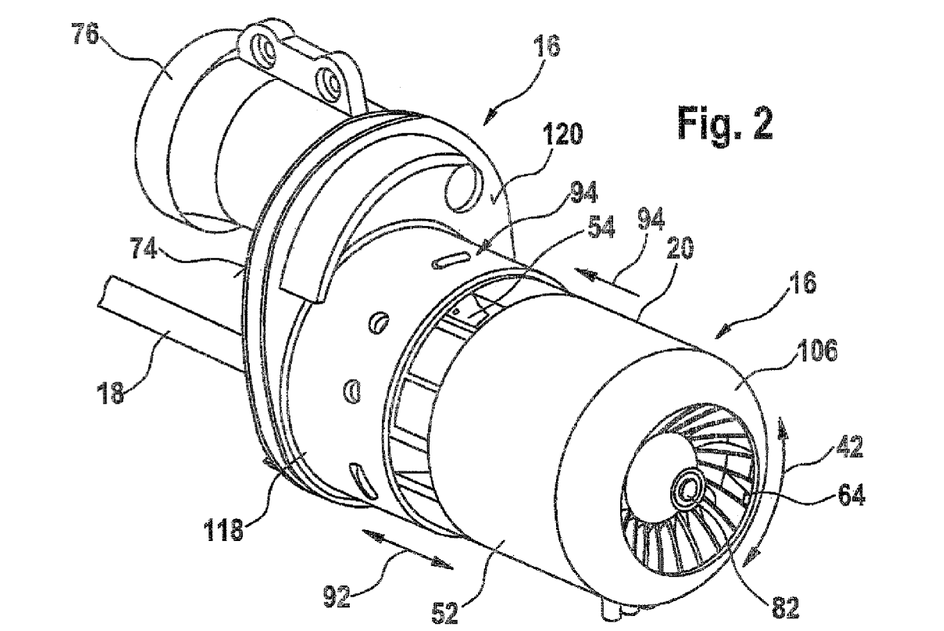
FIG. 2 is a perspective depiction of a subregion of the electrical device with a receiving unit and a motor unit.
Figure 3:
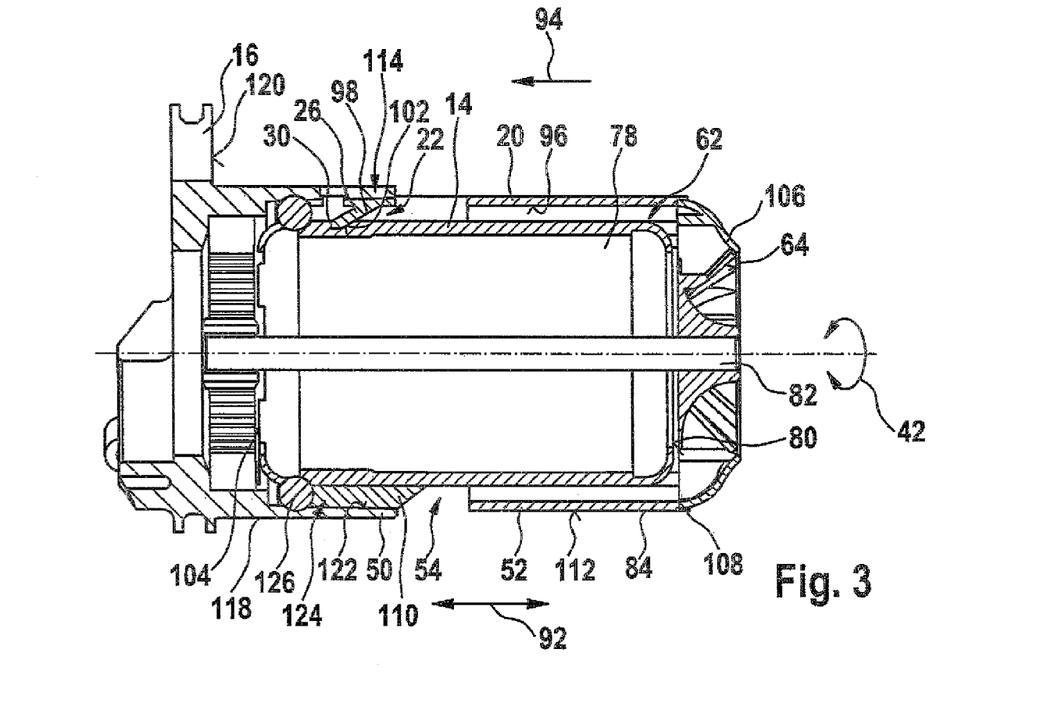
FIG. 3 is a sectional depiction of a subregion of the receiving unit with the motor unit.
Figure 4:
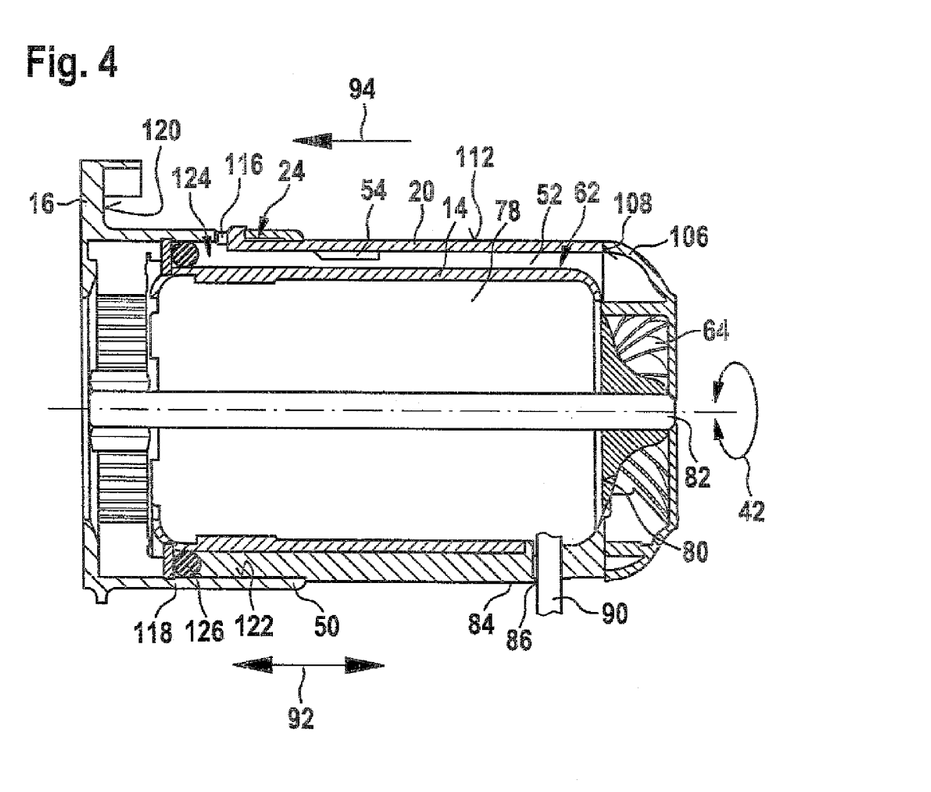
FIG. 4 is another sectional depiction of a subregion of the receiving unit with the motor unit.

FIGS. 2 through 4 show the receiving unit 16 of the hand-guided power tool, with a motor unit 12 mounted in receiving unit 16. The receiving unit 16 is provided to receive transmission elements and/or drive elements and comprised of an intermediate flange of the hand-guided power tool. On a side 74 oriented away from the motor unit 12, the receiving unit 16 has a sleeve-shaped receiving element 76 that is provided for receiving a drive element comprised of a hammer tube and/or a drive element comprised of an impact mechanism of the hand-guided power tool (FIG. 2). In addition, on the side 74 oriented away from the motor unit 12, an additional drive element is situated on the intermediate flange. The additional drive element is comprised of a drive shaft 18 that transmits a driving torque produced by the motor unit 12 to other transmission elements not shown in detail here during operation of the hand-guided power tool.

The motor unit 12 includes an electrically operated motor 78, a motor housing 14, and a fan 64 and is coupled to the receiving unit 16 by means of a motor sleeve 20 (FIGS. 2 through 4). The motor sleeve 20 is cylindrically embodied and constitutes a receiving region 62 for the motor unit 12. When the motor unit 12 and the motor sleeve 20 are in an assembled position, the motor sleeve 20 encompasses the motor unit 12 in a circumference direction 42. Inside the receiving region 62 of the motor sleeve 20, the fan 64 is situated at an end 80 of the motor unit 12 and motor housing 14 oriented away from the receiving unit 16. During operation of the motor unit 12, the fan 64 is driven via a motor shaft 82 of the electrically driven motor 78 and is provided to cool the electrically driven motor 78 and protect it from an undesirable overheating. In addition, the motor sleeve 20 has an opening 86 inside a cylindrical wall 52 in a subregion 84 oriented toward the fan 64 through which it is possible to route a power cord 90 to supply power to the motor unit 12 (FIG. 4).

In order to fasten the motor unit 12 to the motor sleeve 20, the motor sleeve 20 has a fastening unit 22 that is situated in a subregion 114 oriented toward the receiving unit 16 and has a plurality of fastening means 26, 28 for securing the motor unit 12 in an axial direction 92 (FIGS. 2-4). The axial direction 92 extends essentially parallel to the motor shaft 82 of the motor unit 12 and parallel to an assembly direction 94 of the motor unit 12 when it is assembled with the motor sleeve 20. The fastening means 26, 28 here are each comprised of a respective detent element that is hook-shaped. The detent elements are situated spaced apart from each other in a circumference direction 42 of the motor sleeve 20 on a surface 96 oriented radially inward. In addition, the detent elements each have a respective detent bevel 98, which is oriented obliquely in relation to the cylindrical wall 52 of the motor sleeve 20, and also each have one span component oriented radially inward and one span component oriented in the assembly direction 94. In order to fasten the motor unit 12, the motor housing 14 of the motor unit 12 has detent elements 30 that correspond to the detent elements of the motor sleeve 20 (fastening means 26, 28) and are each comprised of a respective detent recess; the detent recesses each have an oblique surface 102 corresponding to the respective detent element so that a maximum contact surface is achieved between the detent element of the motor sleeve 20 and the detent element 30 of the motor housing 14. The detent recesses have a width in a circumference direction 42 that is slightly wider than a width of the hook-like detent elements of the motor sleeve 20, but is at most 20% wider than the width of the detent elements so that in addition to securing the motor unit 12 in the axial direction 92, they also secure it in a circumference direction 42 at the same time. Fundamentally, however, it is also conceivable for the detent elements 30 of the motor housing 14 and the detent recesses to be comprised of a circumferential groove.

The fastening unit 22 also has additional fastening means 36, 38, 40 for securing the motor unit 12 in the circumference direction 42 inside the motor sleeve 20. The fastening means 36, 38, 40 are each comprised of a rib extending in an axial direction 92, with the ribs being respectively situated on the radially inward-oriented surface 96 of the motor sleeve 20. The ribs extend essentially over the entire length of the motor sleeve 20 (FIG. 3). The motor housing 14 of the motor unit 12 has flute-shaped recesses extending in the axial direction 92 so that a rotation-preventing support of the motor unit 12 inside the motor sleeve 20 is achieved. Basically, however, it is always conceivable to situate the rib-shaped fastening means 36, 38, 40 on the motor housing 14 of the motor unit 12 and to situate the flute-shaped recess on the radially inward-oriented surface 96 of the motor sleeve 20.

In the assembly direction 94 before the fastening unit 22, the cylindrical wall 52 of the motor sleeve 20 is provided with air inlet openings 54 through which air can flow to cool the motor unit 12. During operation of the motor unit 12, the air is sucked in by the fan 64 and flows along the cooling conduits 56 in the direction opposite from the assembly direction 94. The cooling conduits 56 are delimited in the circumference direction 42 by the axially extending ribs (fastening means 36, 38, 40) and are delimited in a radial direction by the motor sleeve 20 and the motor unit 12 (FIG. 2).

In order to install the motor unit 12, the end 104 of the motor unit 12 oriented away from the fan 64 is inserted into the motor sleeve 20 until the detent elements of the motor sleeve 20 engage in the detent recesses of the motor housing 14. The ribs extending in the axial direction 92 also provide guidance during an insertion procedure of the motor unit 12. The detent elements of the motor sleeve 20 and the detent elements 30 of the motor housing 14 secure the motor unit 12 to the motor sleeve 20, preventing it from moving in the direction opposite from the assembly direction 94. The fan 64 of the motor unit 12 includes a housing 106 that, in an installed position of the motor unit 12, rests against an end 108 of the motor sleeve 20 oriented away from the receiving unit 16, thus preventing the motor unit 12 from being inserted too far into the motor sleeve 20 (FIGS. 3 and 4).

Figure 5:
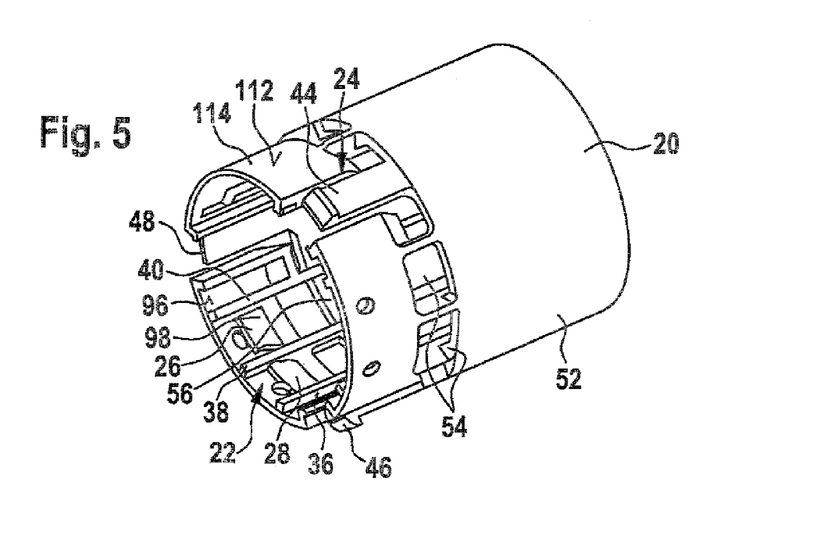
FIG. 5 is a perspective depiction of a motor sleeve from FIGS. 2 through 4.

In order to fasten the motor sleeve 20 to the receiving unit 16, the motor sleeve 20 has an additional fastening unit 24 that has fastening means 44, 46, 48 comprised of detent elements (FIG. 5). The detent elements are embodied as hook-shaped and are situated on a radially outward-oriented surface 112 of the motor sleeve 20. In principle, alternative embodiments of the fastening means 44, 46, 48 are also always conceivable in another embodiment of the invention, e.g. in the form of a bayonet coupling element, a screw element, and/or any other fastening means 44, 46, 48 deemed suitable by those skilled in the art. The hook-shaped detent elements are situated in a subregion 114 of the motor sleeve 20 oriented toward the receiving unit 16 and in order to produce a fastening, engage in detent recesses 116 provided for this on the receiving unit 16 so that the detent elements produce a form-locked and frictionally engaging connection with an edge of the detent recesses 116. The detent recesses 116 are situated in a receiving sleeve 118 of the receiving unit 16; the receiving sleeve 118 extends along the axial direction 92 on the side 120 of the receiving unit 16 oriented toward the motor unit 12. In order to secure the motor sleeve 20 and motor unit 12 jointly in the circumference direction 42, the detent recesses 116 of the receiving unit 16 are slightly wider than the detent elements of the motor sleeve 20, but are at most only 20% wider than the 10 elements.

In addition, on a radially inward-oriented surface 122 of the receiving sleeve 118, the receiving unit 16 has a conically embodied form-locking element 50 so that the receiving sleeve 118 forms a tapering receiving region 124 for receiving the motor sleeve 20 and motor unit 12 jointly (FIGS. 2 and 3). During installation of the motor sleeve 20, the tapered receiving region 124 permits a simple centering and has a large contact surface with the motor sleeve 20, which for this purpose, has a form-locking element 110 that tapers in the assembly direction 94 and corresponds to the tapering receiving region 124. In order to fasten the motor sleeve 20 and motor unit 12 jointly to the receiving unit 16, an O-ring 126 is arranged around the motor unit 12 in the circumference direction 42 on a side 104 oriented toward the receiving unit 16 and is provided for a precisely fitting and play-free fastening of the motor sleeve 20 and motor unit 12 to the receiving unit 16 and for a prestressing between the receiving unit 16 and the motor unit 12 together with the motor sleeve 20 in an assembled position. In an assembled position, the motor unit 12 is supported on the receiving unit 16 exclusively by means of the motor sleeve 20 and the form-locking element and fastening units 22, 24 while a region of the motor unit 12 oriented away from the receiving unit 16 is situated in a free-floating fashion inside the hand-guided power tool. In lieu of the O-ring 126, in another embodiment of the invention, it is also always conceivable to provide an elastic shaped element and/or other elements or components deemed suitable by those skilled in the art in order to achieve a precisely fitting and play-free fastening of the motor sleeve 20 and motor unit 12 to the receiving unit 16.

Figure 6:
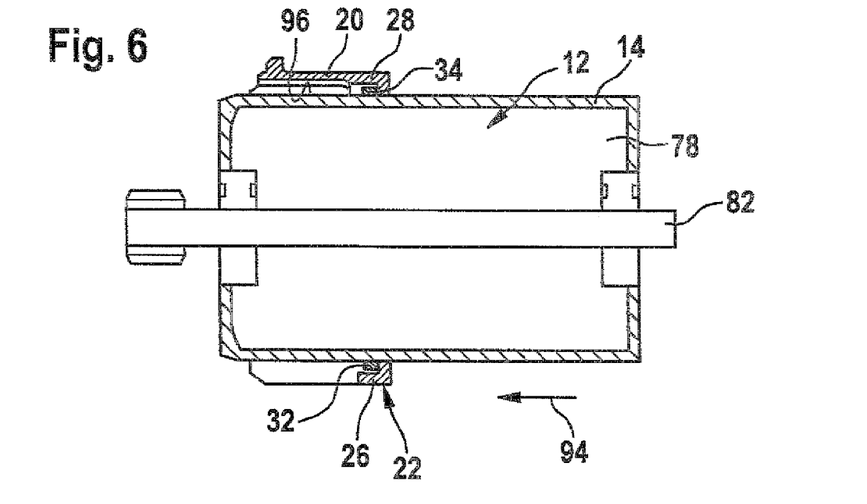
FIG. 6 is a schematic side view of a motor unit and a receiving unit, with an alternative fastening unit.
Figure 7:
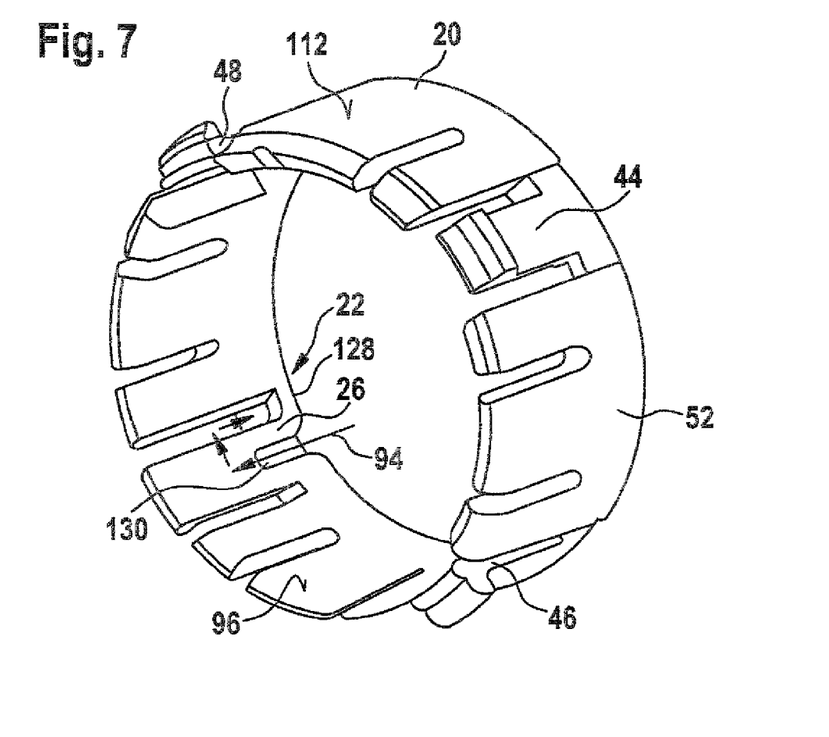
FIG. 7 is a perspective depiction of an alternative motor sleeve.
Figure 8:
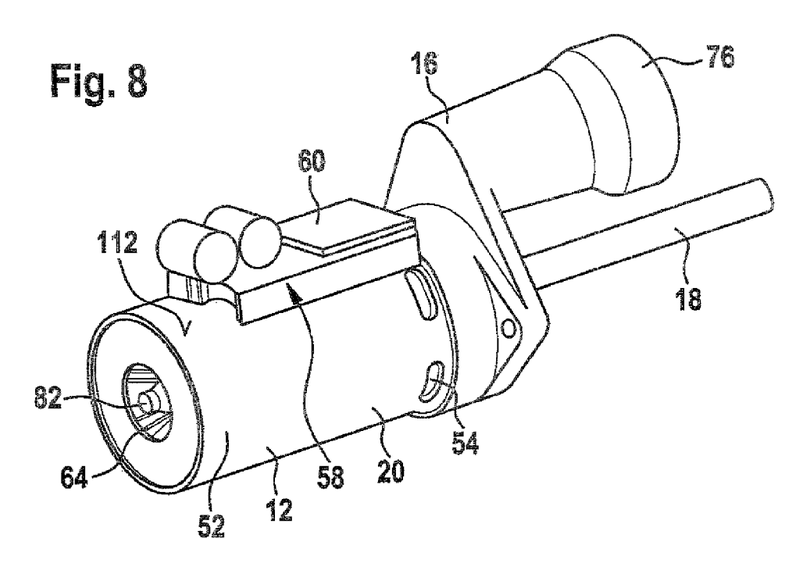
FIG. 8 is a perspective depiction of a subregion of the electrical device with an alternative receiving unit and a motor unit.

FIGS. 6 through 8 show alternative exemplary embodiments. Components, features, and functions that remain the same are basically labeled with the same reference numerals. The description below is essentially limited to the differences from the exemplary embodiment shown in FIGS. 1 through 5; with regard to the components, features, and functions that remain the same, please refer to the description of the exemplary embodiment in FIGS. 1 through 5.

FIG. 6 shows a motor unit 12 of a hand-guided power tool together with a motor sleeve 20; in the assembly direction 94, the motor sleeve 20 overlaps a subregion of the motor unit 12 oriented toward the receiving unit 16. In order to fasten the motor unit 12 to the motor sleeve 20, the motor sleeve 20 has a fastening unit 22 that has fastening means 26, 28 embodied in the form of bayonet coupling elements (FIGS. 6 and 7). The bayonet coupling elements are each comprised of a guide channel on a radially inward-oriented surface 96 of the motor sleeve 20 for a projection-like fastening means of the motor unit 12 embodied in the form of a bayonet coupling element 32, 34. The guide channel is oriented in the assembly direction 94 in order to permit an insertion of the projection-like fastening means and, after an insertion region 130, changes its orientation by approximately 90° and then extends essentially perpendicular to the assembly direction 94, thus permitting a rotating motion of the motor unit 12 in relation to the motor sleeve 20. In order to achieve a securing position of the projection-like fastening means, the guide channel changes its orientation again by approximately 90° and then extends in the direction opposite from the assembly direction 94 and parallel to the insertion region 130; the guide channel is delimited in a radial direction by a cylindrical wall 52 of the motor sleeve 20 and is delimited in the direction opposite from the assembly direction 94 by a stop 128 of the motor sleeve 20.

FIG. 8 shows a subregion of a hand-guided power tool with a receiving unit 16, a motor unit 12, and a motor sleeve 20. The motor sleeve 20 has an additional receiving region 58 for receiving a set of motor electronics 60. The receiving region 58 is situated in a radially outward-oriented surface 112 of a cylindrical wall 52 of the motor sleeve 20 so that the motor electronics 60 are advantageously cooled by cooling conduits 56 that extend between the motor sleeve 20 and the motor unit 12.

The foregoing relates to the preferred exemplary embodiments of the invention, it being understood that other variants and embodiments thereof are possible within the spirit and scope of the invention, the latter being defined by the appended claims.

The invention claimed is:

1. An electrical power tool, comprising:
 a power tool housing;
 a motor unit that includes a motor housing;
 a receiving unit which is received within the power tool housing for receiving at least one drive element;
 a motor sleeve which surrounds the motor unit and motor housing, and via which the motor unit is coupled to the receiving unit, the motor sleeve including an end region through which an end portion of the motor unit extends out of the motor sleeve; and
 an elastic member positioned around an outer surface of the end portion of the motor unit;
 wherein the receiving unit includes a receiving sleeve that surrounds a receiving region in which the end region of the motor sleeve and the end portion of the motor unit are received,
 wherein the motor sleeve includes a first fastening unit that is configured to removably fasten the motor housing of the motor unit to the motor sleeve and a second fastening unit that is configured to removably fasten the motor sleeve to the receiving sleeve of the receiving unit,
 wherein the motor sleeve and the motor unit are each received within the power tool housing along with the receiving unit, and
 wherein the elastic member is pressed against an inner surface of the receiving sleeve by the outer surface of the end portion of the motor unit when the motor unit is fastened to the motor sleeve and the motor sleeve is fastened to the receiving sleeve.

2. The electrical device as recited in claim 1, wherein the second fastening unit includes a detent element.

3. The electrical device as recited in claim 2, wherein the first fastening unit has at least one detent element and/or bayonet coupling element for fastening the motor housing to the motor sleeve.

4. The electrical device as recited in claim 1, wherein the second fastening unit includes a bayonet coupling element.

5. The electrical device as recited in claim 4, wherein the first fastening unit has at least one detent element and/or bayonet coupling element for fastening the motor housing to the motor sleeve.

6. The electrical device as recited in claim 1, wherein the first fastening unit has at least one fastening means for securing the motor unit in a circumference direction.

7. The electrical device as recited in claim 6, wherein the fastening means is comprised of an axially extending rib.

8. The electrical device as recited in claim 1, wherein the receiving unit has at least one conically embodied form-locking element for centering the motor sleeve.

9. The electrical device as recited in claim 1, wherein the motor sleeve has at least one cooling conduit for cooling the motor unit.

10. The electrical device as recited in claim 1, wherein the motor sleeve has a wall with at least one air inlet opening.

11. The electrical device as recited in claim 1, wherein the motor sleeve has a receiving region which receives a set of motor electronics.

12. The electrical device as recited in claim 1, wherein the motor sleeve has at least one receiving region in which a fan of the motor unit is at least partially situated.

13. The electrical power tool of claim 1, wherein the end region of the motor sleeve is positioned in engagement with the elastic member when the motor unit is fastened to the motor sleeve and the motor sleeve is fastened to the receiving sleeve.

14. The electrical power tool of claim 13, wherein the receiving sleeve includes a ledge portion that protrudes into the receiving region from the inner surface of the receiving sleeve, and
 wherein the elastic member is pressed against the ledge portion by the end region of the motor sleeve which is positioned in engagement with the elastic member when the motor unit is fastened to the motor sleeve and the motor sleeve is fastened to the receiving sleeve.

15. The electrical power tool of claim 14, wherein the elastic member comprises an O-ring.

* * * * *